(12) United States Patent
Sakai et al.

(10) Patent No.: US 9,557,165 B2
(45) Date of Patent: Jan. 31, 2017

(54) METHOD FOR MEASURING END PORTION SHAPE OF THREADED PIPE OR TUBE

(71) Applicant: NIPPON STEEL & SUMITOMO METAL CORPORATION, Tokyo (JP)

(72) Inventors: Kenta Sakai, Tokyo (JP); Tatsuro Honda, Tokyo (JP); Seiji Hiraoka, Tokyo (JP)

(73) Assignee: NIPPON STEEL & SUMITOMO METAL CORPORATION, Tokyo (JP)

(*) Notice: Subject to any disclaimer, the term of this patent is extended or adjusted under 35 U.S.C. 154(b) by 230 days.

(21) Appl. No.: 14/368,539

(22) PCT Filed: Dec. 27, 2012

(86) PCT No.: PCT/JP2012/083771
§ 371 (c)(1),
(2) Date: Jun. 25, 2014

(87) PCT Pub. No.: WO2013/100004
PCT Pub. Date: Jul. 4, 2013

(65) Prior Publication Data
US 2014/0355004 A1  Dec. 4, 2014

(30) Foreign Application Priority Data

Dec. 27, 2011 (JP) ................................. 2011-286462

(51) Int. Cl.
*G01B 11/24* (2006.01)
*G01B 11/25* (2006.01)

(52) U.S. Cl.
CPC .......... *G01B 11/24* (2013.01); *G01B 11/2425* (2013.01); *G01B 11/25* (2013.01)

(58) Field of Classification Search
None
See application file for complete search history.

(56) References Cited

U.S. PATENT DOCUMENTS

| 4,544,268 A | 10/1985 | Yamada et al. |
| 5,521,707 A | 5/1996 | Castore et al. |
| 6,137,570 A * | 10/2000 | Chuang ............. G01N 21/9501 |
| | | 250/559.04 |

(Continued)

FOREIGN PATENT DOCUMENTS

| CN | 101995218 | 3/2011 |
| JP | 54-114264 | 9/1979 |

(Continued)

*Primary Examiner* — Kara E Geisel
*Assistant Examiner* — Amanda Merlino
(74) *Attorney, Agent, or Firm* — Clark & Brody

(57) ABSTRACT

The present invention provides a method for measuring an end portion shape of a threaded pipe or tube P, the method including: a thread axis detection step; a laser light positioning step; a laser light image capture step; and a shape calculation step. In the laser light positioning step, the light source 1 and the image capture device 2 are moved together so that: the optical axis LA of the light source is located so as to pass through a measurement point D (X1, Y1, Z1) on the thread axis A, the measurement point being located in the measurement target region within a plane NP including the thread axis; and the laser light L extends in a slit-like form within the plane.

1 Claim, 5 Drawing Sheets

(56) References Cited

U.S. PATENT DOCUMENTS

2011/0164244 A1* 7/2011 Honda .................. G01B 5/163
356/72

FOREIGN PATENT DOCUMENTS

| JP | 58-45506 | 3/1983 |
| JP | 58-146842 | 9/1983 |
| JP | 61-75204 | 4/1986 |
| JP | 63-212808 | 9/1988 |
| JP | 2001-188008 | 7/2001 |
| JP | 3552440 | 5/2004 |
| JP | 4457370 | 2/2010 |
| JP | 4486700 | 6/2010 |

* cited by examiner

Figure 3A
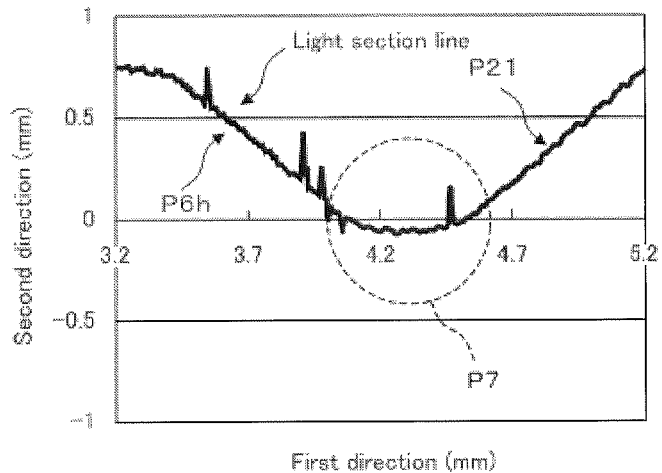
Figure 3B
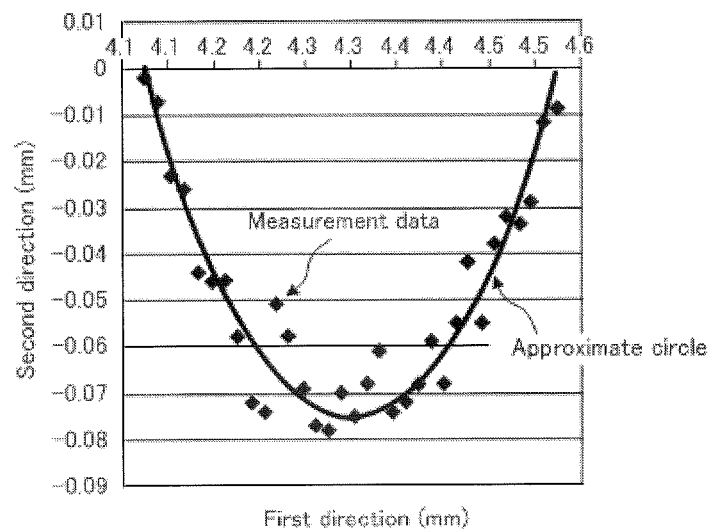
Figure 3C
| | Error relative to design value |
|---|---|
| First time | −0.01mm |
| Second time | −0.00mm |
| Third time | +0.01mm |
| Fourth time | −0.04mm |

| | Error relative to design value |
|---|---|
| First time | −0. 0° |
| Second time | −0. 1° |
| Third time | −0. 3° |
| Fourth time | +0. 1° |

METHOD FOR MEASURING END PORTION SHAPE OF THREADED PIPE OR TUBE

TECHNICAL FIELD

The present invention relates to a method for accurately and promptly measuring a shape of a thread part or a seal part formed at an end portion of a threaded pipe or tube such as an oil well pipe or tube. Hereinafter "pipe or tube" is referred to as "pipe" when deemed appropriate.

BACKGROUND ART

Conventionally, as a method for connecting end portions of pipes such as oil well pipes to each other, a conventional method has been to form a thread part (external thread part) at each of outer peripheral surfaces of the end portions of the pipes to provide threaded pipes and fasten each of the respective thread parts (external thread parts) of a pair of the threaded pipes to a joint (box joint) with a thread part (internal thread part) formed at an inner peripheral surface thereof to connect the end portions of the pipes.

A low dimensional accuracy of the thread parts formed at the end portions of the pipes may loosen a fastened state to the joints, resulting in the pipes being disconnected and coming off or a fluid flowing inside the pipes leaking to the outside. In particular, requirements for dimensional accuracies or quality assurance levels of thread parts of oil well pipes are becoming strict year by year along with an increase in harshness of the oil well environments in recent years.

FIGS. 1A and 1B are cross-sectional diagrams schematically illustrating an example of an end portion shape of an oil well pipe. FIG. 1A is a cross-sectional view of the entire end portion, and FIG. 1B is an enlarged view of the circular region indicated by symbol X in FIG. 1A.

As illustrated in FIGS. 1A and 1B, an end portion of an oil well pipe P includes a thread part P3 provided with a thread ridge P1 and a thread groove P2, a parallel part P5 adjacent to the thread part P3, the parallel part P5 being provided on the pipe end face E side relative to the thread part P3, and a seal part P4 adjacent to the parallel part P5, the seal part P4 being provided on the pipe end face E side relative to the parallel part P5.

Along with an increase in harshness of the oil well environments in recent years, pipes including a thread part P3 formed therein are often used for oil well pipes P. The thread part P3 includes a pair of flank faces P6 defining a thread ridge P1 of the thread part P3 (surfaces connecting a top part P11 of the thread ridge P1 and bottom parts P21 of the thread groove P2), and from among the pair of flank faces P6, a flank face P6 facing away from the pipe end face E side (flank face P6 on the side on which a load against a tensile force in a thread axis (center axis of the thread part P3) "A" direction is imposed when connecting pipe end portions) is a flank face inclined so as to be closer to the pipe end face E side from the top part P11 of the thread ridge P1 toward the bottom part P21 of the thread groove P2 (hereinafter referred to as "hook-like flank face P6$h$").

Conventionally, for evaluation of an angle (angle formed with a line N perpendicular to the thread axis A) α of a flank face P6 or a curvature of a thread root R part (part in which a flank face P6 and a bottom part P21 of a thread groove P2 cross) P7, a mold is taken of the thread part P3 using, e.g., silicon rubber. Subsequently, the mold is cut into cross-sections such that the angle of the flank face P6 or the curvature of the thread root R part P7 can be evaluated, and an enlarged shadow of the cross-section is projected onto a transparent film using a projector. On the transparent film, a tolerance for the cross-section according to a tolerance of the angle of the flank face P6 or a tolerance of the curvature of the thread root R part P7 is outlined, and whether or not an edge of the shadow falls within the tolerance for the cross-section is checked visually to determine the acceptability of the angle of the flank face P6 or the curvature of the thread root R part P7.

Also, an inspection similar to that of the aforementioned thread part P case may be conducted for a curvature of a front edge R part (part where a shoulder face P41 and a seal face P42 of a seal part P4 cross) P43 of the seal part P4.

The inspection such as mentioned above requires a great deal of time and effort in, e.g., taking a mold of the thread part P3 or the seal part P4 and cutting the mold into cross-sections. Thus, a sampling inspection, such as an inspection being performed only for first and last oil well pipes P in a same production lot, is inevitable because of difficulty to conduct a total inspection.

Furthermore, the acceptability is determined merely based on a comparison with the tolerance, and thus, a quantitative evaluation in shape of the thread part P3 or the seal part P4 is difficult.

In order to solve such problems, Patent Literatures 1 and 2 each propose a method in which light is radiated in parallel to a thread groove P2 to detect light passing through a thread part P3 to measure an external shape of the thread part P3 (which is a recessed and projecting shape of a surface of the thread part P3 and is referred to as "thread profile") (light projection method). If the thread profile of the thread part P3 can be measured with good accuracy using the light projection method, an angle of a flank face P6 and a curvature of a thread root R part P7 could be calculated with good accuracy.

However, since the thread profile has a curved line, a flank face P6 may fall in the shadow of a ridge line of the thread ridge P1, in which case it is impossible to accurately detect the flank face P6 using the aforementioned light projection method in which parallel light is detected. In particular, if the flank face P6 is a hook-like flank face P6$h$, an error caused as a result of the hook-like flank face P6$h$ falling in the shadow of the ridge line of the thread ridge P1 cannot be ignored.

Therefore, as described in Patent Literature 3, the present applicants propose a method of measuring a shape of a flank face P6 of a thread part P3 using a contact probe.

However, in the method described in Patent Literature 3, a contact probe is sequentially moved and a spherical contactor attached to a front edge thereof is brought into contact with the flank face P6 to perform measurement, inevitably resulting in long measurement time and an insufficient number of measurement points. Thus, an angle of the flank face P6 may not be measured accurately.

Also, since the contactor has predetermined dimensions, it is also difficult to measure a curvature of a thread root R part P7 with good accuracy.

Also, Patent Literature 3 described above and Patent Literature 4 propose a method of detecting a thread axis.

CITATION LIST

Patent Literature

[Patent Literature 1] JP3552440B
[Patent Literature 2] JP63-212808A
[Patent Literature 3] JP4486700B
[Patent Literature 4] JP4457370B

SUMMARY OF INVENTION

Technical Problem

The present invention has been made in order to solve the problems in the prior art such as mentioned above, and an object of the present invention is to provide a method that enables accurate and prompt measurement of a shape of a thread part or a seal part formed at an end portion of a threaded pipe such as an oil well pipe.

Solution to Problem

As a result of diligent study to achieve the object, the present inventors turned their attention to the point that employment of a light-section method using slit-like laser light enables prompt measurement of a shape of a thread part or a seal part. Then, the present inventors conceived of the idea that a shape of a thread part can be accurately measured by positioning laser light in such a way that an optical axis of a light source that emits slit-like laser light passes through a point on a thread axis and the slit-like laser light extends within a plane including the thread axis and thereby has completed the present invention.

The present invention provides a method for measuring an end portion shape of a threaded pipe or tube, the method comprising the following (1)-(4) steps.

(1) a thread axis detection step: detecting a thread axis of the threaded pipe or tube (2) a laser light positioning step: moving and positioning a light source that emits slit-like laser light and an image capture device having a visual axis extending in a direction different from that of an optical axis of the light source together to a position where the laser light emitted from the light source can be applied to a thread part or a seal part of the threaded pipe or tube, the thread part or the seal part being a measurement target region (3) a laser light image capture step: applying laser light from the light source to the measurement target region and capturing an image of the applied laser light by the image capture device (4) a shape calculation step: subjecting the captured image obtained in the laser light image capture step to image processing to calculate a shape of the measurement target region In the (2) step (laser light positioning step), the light source and the image capture device are moved together so that: the optical axis of the light source is located so as to pass through a measurement point on the thread axis, the measurement point being located in the measurement target region within a plane including the thread axis; and the laser light extends in a slit-like form within the plane.

According to the present invention, in the thread axis detection step, a thread axis of a threaded pipe is detected. The thread axis can be detected using a known method such as described in Patent Literature 3 or 4 mentioned above. For example, when the method described in Patent Literature 4 is used, a direction of a pipe end face E, and thus inclinations θ1 and θ2 of a thread axis A perpendicular to the pipe end face E can be detected by an end face following mechanism including three or more contact sensors (see FIGS. 2A to 2D). Furthermore, as a result of a position of the pipe end face E being measured by the end face following mechanism and a seal diameter being measured by a dimensional measurement mechanism, an intersection point C (X0, Y0, Z0) between the pipe end face E and the thread axis A can be detected (see FIGS. 2A to 2D). Once the intersection point C (X0, Y0, Z0) and the inclinations θ1 and θ2 are detected as described above, the thread axis A is uniquely determined.

Next, according to the present invention, in the laser light positioning step, a light source 1 that emits slit-like laser light L and image capture device 2 having a visual axis VA extending in a direction that is different from that of an optical axis LA of the light source 1 are moved together to and positioned at a position where the laser light L emitted from the light source 1 can be applied to a thread part P3 or a seal part P4, which is a measurement target region, of a threaded pipe P (see FIGS. 2A to 2D).

Then, in the laser light image capture step, the laser light L is applied from the light source 1 to the measurement target region, and an image of the applied laser light L is captured by the image capture device 2 (see FIGS. 2A to 2D). Furthermore, in the shape calculation step, the captured image obtained in the laser light image capture step is subjected to image processing (for example, image processing by image processing device 3 illustrated in FIGS. 2A to 2D) to calculate a shape of the measurement target region (for example, calculate a measurement value relating to at least one of an angle α of a flank face P6, a curvature of a thread root R part P7 and a curvature of a front edge R part P43).

In other words, the shape of the measurement target region is calculated by a light-section method using slit-like laser light L.

In the laser light positioning step, more specifically, the light source 1 and the image capture device 2 are moved (the movement including turning) together so that: the optical axis LA of the light source 1 is located so as to pass through a measurement point D (X1, Y1, Z1) on the thread axis A, which is located in the measurement target region (the thread part P3 or the seal part P4) within a plane NP including the thread axis A; and the laser light L extends in a slit-like form within the plane NP (see FIGS. 2A to 2D).

Consequently, the laser light L emitted from the light source 1 is applied along an outer edge of a cross-section obtained where the threaded pipe P is cut along the plane NP including the thread axis A. In other words, a light section line is applied along the outer edge of the cross-section of the threaded pipe P, the cross-section including the thread axis A. Also, since the laser light L is applied along the outer edge of the cross-section of the threaded pipe P, the cross-section including the thread axis A, even if the flank face P6 is a hook-like flank face P6h, an image of the applied laser light L can be captured without the hook-like flank face P6h falling in the shadow of a ridge line of a thread ridge P1, by appropriately adjusting the visual axis VA of the image capture device 2. Thus, in the shape calculation step, it can be expected that the shape of the thread part P3 or the seal part P4 (cross sectional shape where the thread part P3 or the seal part P4 is cut along the plane NP including the thread axis A) can be measured with good accuracy. Furthermore, since the light-section method is used, the shape of the measurement target region can promptly be measured without requiring a long period of time compared to cases where measurement is performed using a contact probe.

In order to move the light source 1 and the image capture device 2 together so that the optical axis LA of the light source 1 passes through the measurement point D (X1, Y1, Z1) within the plane NP including the thread axis A and the laser light L extends in a slit-like form within the plane NP, for example, the light source 1 and the image capture device 2 may be mounted to a dimensional measurement mechanism described in Patent Literature 4 via a known drive stage capable of displacement in each of an X direction, a Y direction and a Z direction and turning around each of the directions.

Advantageous Effect of Invention

The present invention enables accurate and prompt measurement of a shape of a thread part or a seal part formed at an end portion of a threaded pipe such as an oil well pipe.

BRIEF DESCRIPTION OF DRAWINGS

FIGS. 3A to 3C are diagrams illustrating an example of results of measurement of a shape of a thread root R part of a threaded pipe.

DESCRIPTION OF EMBODIMENTS

Hereinafter, a Method for measuring an end portion shape of a threaded pipe (oil well pipe) according to an embodiment of the present invention will be described while referring to the accompanying drawings as necessary.

Figure 1A:
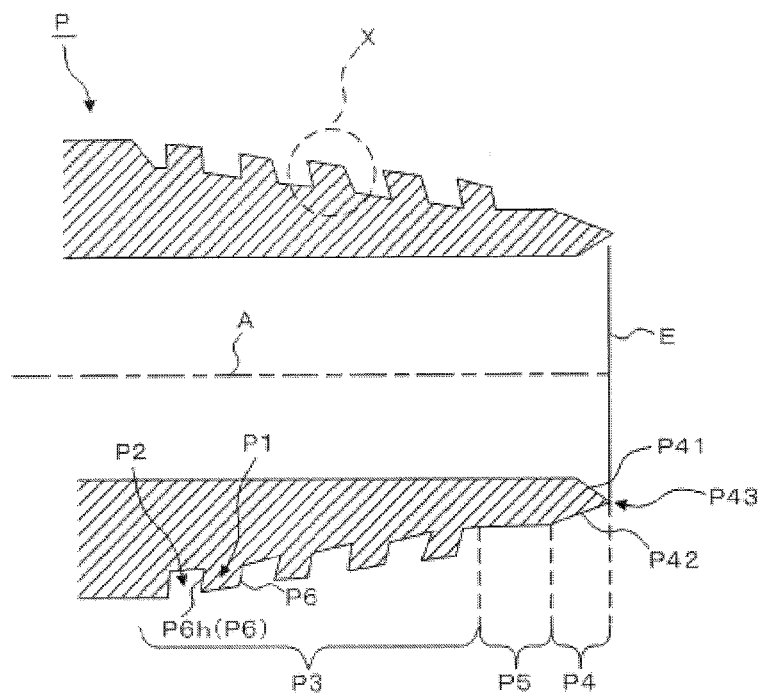
FIGS. 1A and 1B are cross-sectional diagrams schematically illustrating an example of an end portion shape of an oil well pipe.
Figure 1B:
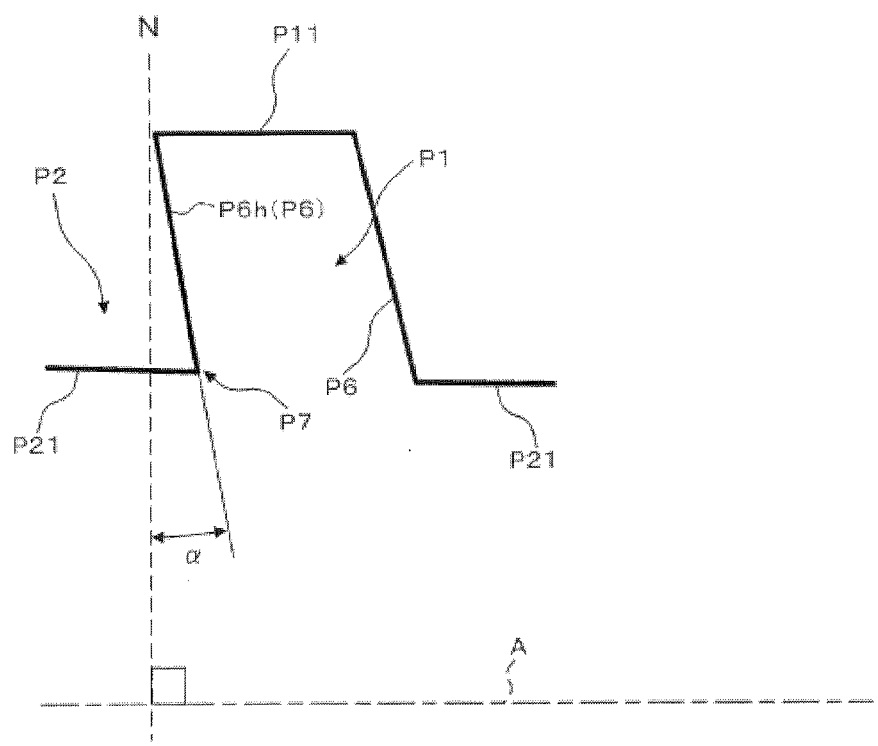
Figure 2A:
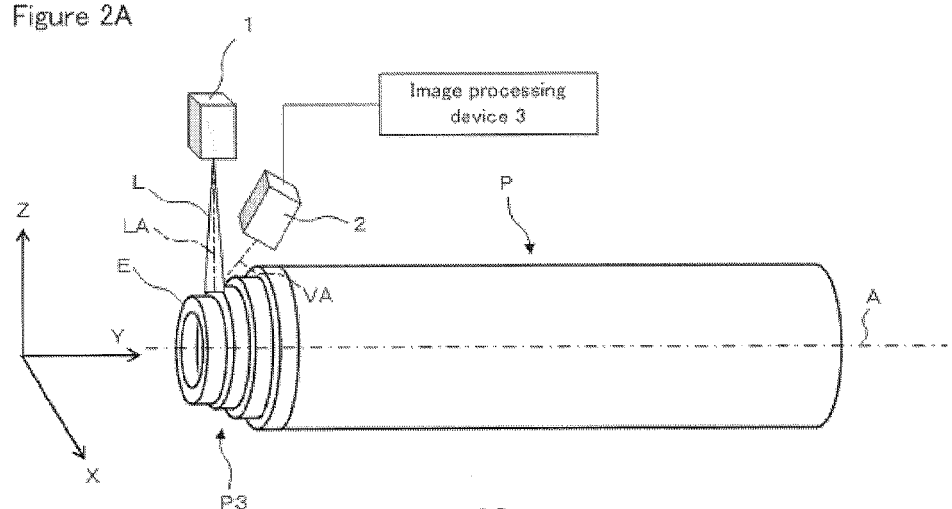
FIGS. 2A to 2D are illustration diagrams illustrating a method for measuring an end portion shape of a threaded pipe according to an embodiment of the present invention.
Figure 2B:
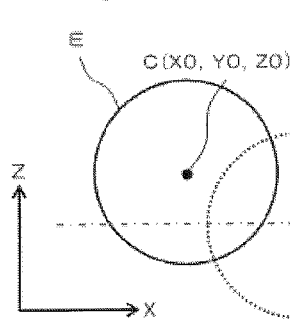
Figure 2C:
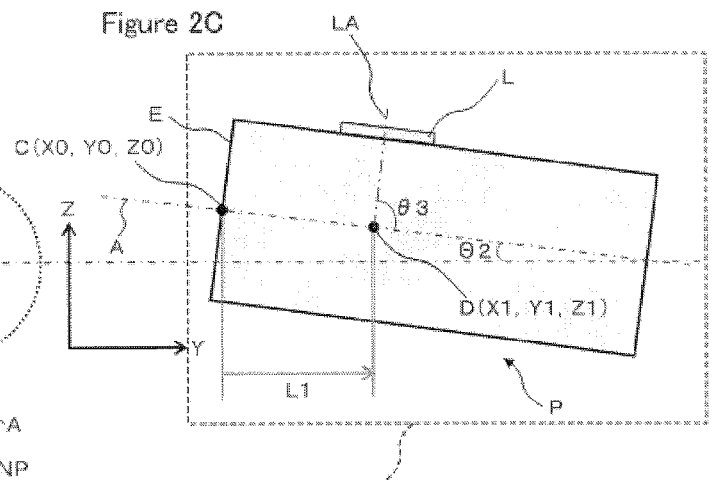
Figure 2D:
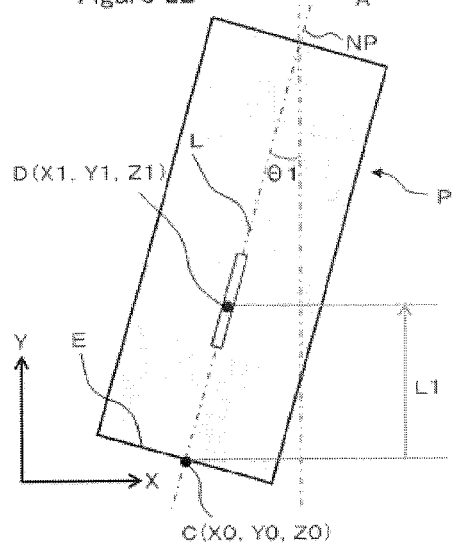

FIGS. 2A to 2D are illustration diagrams illustrating a method for measuring an end portion shape of a threaded pipe (oil well pipe) according to an embodiment of the present invention. FIG. 2A is a diagram schematically illustrating a configuration of an apparatus for measuring an end portion shape of a threaded pipe. FIGS. 2B to 2D are illustration diagrams schematically illustrating a procedure to measure the end portion shape of the threaded pipe: FIG. 2B is a diagram of a view in the Y direction indicated in FIG. 2A; FIG. 2C is a diagram of a view in the X direction indicated in FIG. 2A; and FIG. 2D is a diagram of a view in the Z direction indicated in FIG. 2A. The Z direction indicated in FIGS. 2A to 2D is a vertical direction, and the X direction and the Y direction are directions that are each perpendicular to the Z direction and are perpendicular to each other. The X direction substantially corresponds to a radial direction of the threaded pipe P, and the Y direction substantially corresponds to a longitudinal direction of the threaded pipe P (direction of a thread axis A). However, due to, e.g., bends in the threaded pipe P, the radial direction of the threaded pipe P deviates from the X direction and the direction of the thread axis A of the threaded pipe P deviates from the Y direction. The circle indicated by the dotted line in FIG. 2B indicates a position of a pipe end face E where there are no deviations. Also, for the purpose of illustration, the threaded pipe P illustrated in FIGS. 2B to 2D has a perfect rectangular shape; however, in reality, a diameter of an end portion thereof decreases toward the pipe end face.

The end portion shape measurement method according to the present embodiment includes: (1) thread axis detection step; (2) laser light positioning step; (3) laser light image capture step; and (4) shape calculation step. The respective steps will be sequentially described below.

<1. Thread Axis Detection Step>

In the present step, a thread axis A of a threaded pipe P is detected. For a method for detecting the thread axis A, any of various known methods can be employed: for example, the aforementioned method described in Patent Literature 4 can be used. If the method described in Patent Literature 4 is used, a direction of a pipe end face E can be detected by an end face following mechanism (not illustrated) including three or more contact sensors. Accordingly, inclinations θ1 and θ2 of the thread axis A perpendicular to the pipe end face E can be detected. θ1 is an angle formed by the Y direction and the direction of the thread axis A as viewed in the Z direction (FIG. 2D). θ2 is an angle formed by the Y direction and the direction of the thread axis A as viewed in the X direction (FIG. 2C).

Furthermore, a position of the pipe end face E is measured by the end face following mechanism, and a seal diameter (outer diameter of a parallel part P5) is measured by a dimensional measurement mechanism (not illustrated), whereby an intersection point C (X0, Y0, Z0) between the pipe end face E and the thread axis A can be detected. In other words, as a result of the position of the pipe end face E being measured, an equation for the pipe end face E on the XYZ coordinates can be obtained and furthermore, as a result of the seal diameter being measured, central coordinates in the pipe end face E can be calculated. The calculated central coordinates (X0, Y0, Z0) of the pipe end face E may be regarded as coordinates of the intersection point C between the pipe end face E and the thread axis A.

As a result of the intersection point C (X0, Y0, Z0) and the inclinations θ1 and θ2 being detected as described above, the thread axis A (an equation for the thread axis A on the XYZ coordinates) is uniquely determined.

<2. Laser Light Positioning Step>

In the present step, a light source 1 that emits slit-like laser light L and image capture device 2 having a visual axis VA extending in a direction that is different from that of an optical axis LA of the light source 1 are moved (the movement including turning) together to and positioned at a position where the laser light L emitted from the light source 1 can be applied to a thread part P3 or a seal part P4, which is a measurement target region, of the threaded pipe P. The light source 1 and the image capture device 2 are mounted to a dimensional measurement mechanism (not illustrated) described in Patent Literature 4 via a known drive stage capable of displacement in each of the X direction, the Y direction and the Z direction and also of turning around each of the respective directions, and as a result of the drive stage being driven, the light source 1 and the image capture device 2 can be moved together to a measurement target region.

More specifically, in the present step, the optical axis LA of the light source 1 is located so that: the optical axis LA passes through a measurement point D (X1, Y1, Z1) on the thread axis A, which is located in the measurement target region (the thread part P3 or the seal part P4), within a plane NP including the thread axis A (in the present embodiment, a plane including the thread axis A and a vertical line crossing the thread axis (straight line extending in the Z direction)); and the laser light L extends in a slit-like form within the plane NP.

A further specific description will be provided below.

First, settings are made so that: the optical axis LA of the light source 1 extends in the vertical direction (Z direction); and slit-like laser light L extends in the Y direction. Then, a point D on the thread axis A, which is a distance L1 from the intersection point C (X0, Y0, Z0) on the pipe end face E in the Y direction, is designated as a measurement point. As described above, in the thread axis detection step, the equation for the thread axis A on the XYZ coordinates is uniquely determined, and thus, coordinates (X1, Y1, Z1) of the measurement point D on the thread axis A, which is the distance L1 from the intersection point C (X0, Y0, Z0) in the Y direction, is also uniquely determined.

Then, the drive stage is driven to move the light source 1 and the image capture device 2 together in the X direction and the Y direction so that the optical axis LA of the light source 1 passes through the measurement point D (X1, Y1, Z1). Subsequently, the drive stage is driven to turn the light source 1 and the image capture device 2 together by the angle θ1 around the Z direction so that the laser light L extends in a slit-like form within the plane NP (so that the laser light L extends along the thread axis A as viewed in the Z direction illustrated in FIG. 2D).

Lastly, the drive stage is driven to turn the light source 1 and the image capture device 2 together around the X direction so that the optical axis LA of the light source 1 forms an angle θ3 with the thread axis A. For example, if the angle θ3 is 90°, the light source 1 and the image capture device 2 are turned together by the angle θ2 around the X direction. An optimum angle for capturing an image of the applied laser light L may be determined in advance in, e.g., an experiment, and the determined angle may be used as the angle θ3.

<3. Laser Light Image Capture Step>

In the present step, laser light L is applied from the light source 1 to the measurement target region, and an image of the applied laser light L is captured by the image capture device 2.

<4. Laser Light Image Capture Step>

In the present step, the image captured by the image capture device 2 is subjected to known image processing, such as geometric correction, binarization processing, approximate circle or approximate straight line calculation, by the image processing device 3 to calculate a shape of the measurement target region (calculate, for example, a measurement value relating to at least one of an angle α of a flank face P6, a curvature of a thread root R part P7 and a curvature of a front edge R part P43).

According to the end portion shape measurement method according to the present embodiment including the respective steps described above, laser light L emitted from the light source 1 is applied along an outer edge of a cross-section that would be obtained if the threaded pipe P is cut along the plane NP including the thread axis A. In other words, a light section line is applied along the outer edge of the cross-section of the threaded pipe P including the thread axis A. Furthermore, since the laser light L is applied along the outer edge of the cross-section of the threaded pipe P including the thread axis A, even if the flank face P6 is a hook-like flank face P6h, an image of the applied laser light L can be captured without the hook-like flank face P6h falling in the shadow of a ridge line of a thread ridge P1, by appropriately adjusting the visual axis VA of the image capture device 2. Thus, in the shape calculation step, it can be expected that a shape of the thread part P3 or the seal part P4 (cross-sectional shape of the thread part P3 or the seal part P4 cut along the plane NP including the thread axis A) can be measured with good accuracy. Also, since the light-section method is used, the shape of the measurement target region can promptly be measured without requiring a long period of time for measurement compared to cases where measurement is performed using a contact probe.

Results of measurement of a shape of an end portion of a threaded pipe P including a hook-like flank face by the end portion shape measurement method according to the present embodiment will be described below.

FIGS. 3A to 3C are diagrams illustrating an example of results of measurement of a shape of a thread root R part of a threaded pipe. FIG. 3A is a diagram illustrating an example of a light section line obtained by subjecting an image of laser light L applied to a thread part P3, which has been captured by the image capture device 2, to geometric correction and binariazation by the image processing device 3. More specifically, the light section line illustrated in FIG. 3A is one obtained by subjecting the image captured by the image capture device 2 to geometric correction to obtain a captured image viewed in a direction perpendicular to the plane NP based on a positional relationship between the optical axis LA of the light source 1 and the visual axis VA of the image capture device 2. FIG. 3B is a diagram illustrating an enlarged indication of data on the vicinity of the thread root R part P7 indicated in FIG. 3A (data on picture elements included in the light section line) and an approximate circle obtained from the data. FIG. 3C indicates errors relative to a design value when a curvature radius of a thread root R part P7 of a same thread part P3 is repeatedly measured. The first direction indicated in FIGS. 3A and 3B indicates a direction parallel to the plane NP, and the second direction indicates a direction that is parallel to the plane and perpendicular to the first direction.

As illustrated in FIGS. 3A to 3C, data on the vicinity of a thread root R part P7 was extracted from data of a light section line passing through a hook-like flank face P6h, the thread root R part P7 and a bottom part P21, and an approximate circle was calculated by, e.g., a least squares method and a radius of the approximate circle was evaluated as a curvature radius of the thread root R part P7. As illustrated in FIG. 3C, an error relative to a design value was small even if repeated measurement was performed. In other words, it was found that the end portion shape measurement method according to the present embodiment enables accurate measurement of the curvature (curvature radius) of the thread root R part P7.

Figures 4A, 4B:
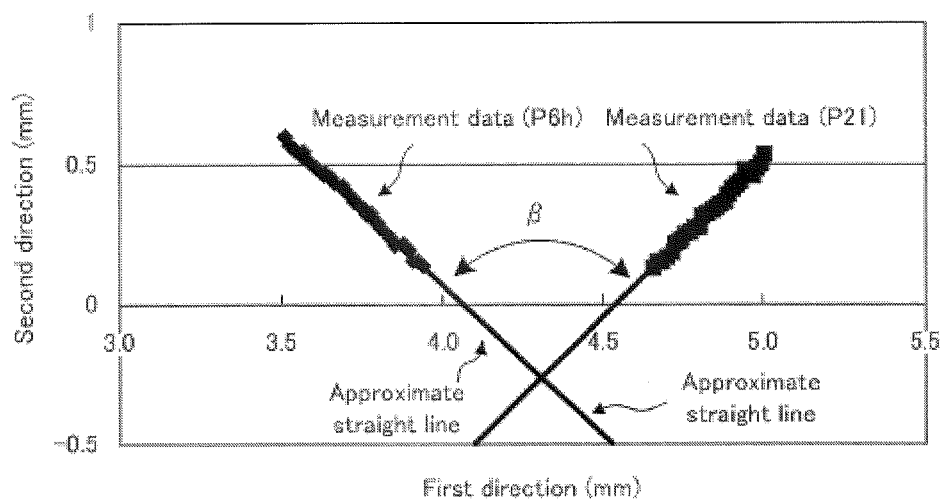
FIGS. 4A and 4B are diagrams illustrating an example of results of measurement of a shape of a flank face of a threaded pipe.

FIGS. 4A and 4B are diagrams illustrating an example of results of measurement of a shape of a flank face of a threaded pipe. FIG. 4A is a diagram illustrating an enlarged indication of data on the vicinity of a hook-like flank face P6h and a bottom part P21 (data on picture elements included in a light section line) extracted from the light section line such as illustrated in FIG. 3A and approximate straight lines obtained from the data. FIG. 4B indicates errors relative to a design value when an angle β formed by a hook-like flank face P6h and a bottom part P21 of a same thread part P3 is repeatedly measured. The meaning of the first direction and the second direction indicated in FIG. 4A is the same as that in the case of FIG. 3.

As illustrated in FIGS. 4A and 4B, data on the vicinity of a hook-like flank face P6h and a bottom part P21 was extracted from data containing a light section line passing through the hook-like flank face P6h, a thread root R part P7 and the bottom part P21, and a pair of approximate straight lines was calculated by, e.g., the least squares method to obtain an angle β formed by the pair of approximate straight lines as an evaluation target. As illustrated in FIG. 4B, even if measurement of the angle β was repeatedly performed, an error relative to the design value was small. Although these results are not results of direct evaluation of an angle (angle formed with a line perpendicular to a thread axis A) α of the hook-like flank face P6h, it can be expected that the end portion shape measurement method according to the present embodiment enables accurate measurement of the angle of the hook-like flank face P6h.

Figure 5A:
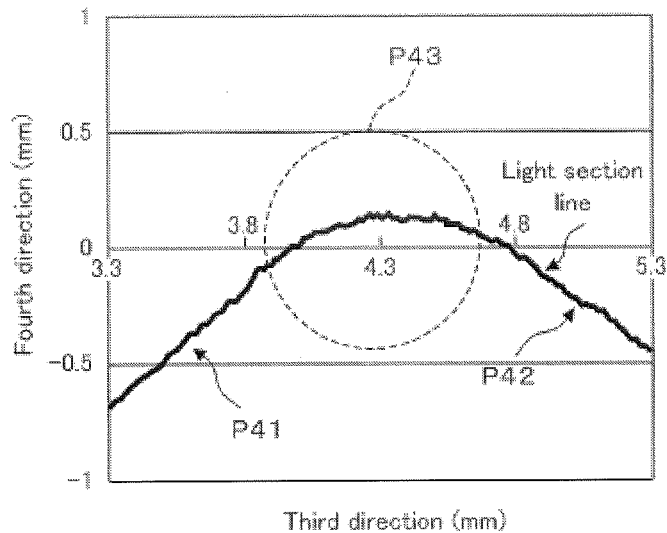
FIGS. 5A and 5B are diagrams illustrating an example of results of measurement of a shape of a front edge R part of a threaded pipe.
Figure 5B:
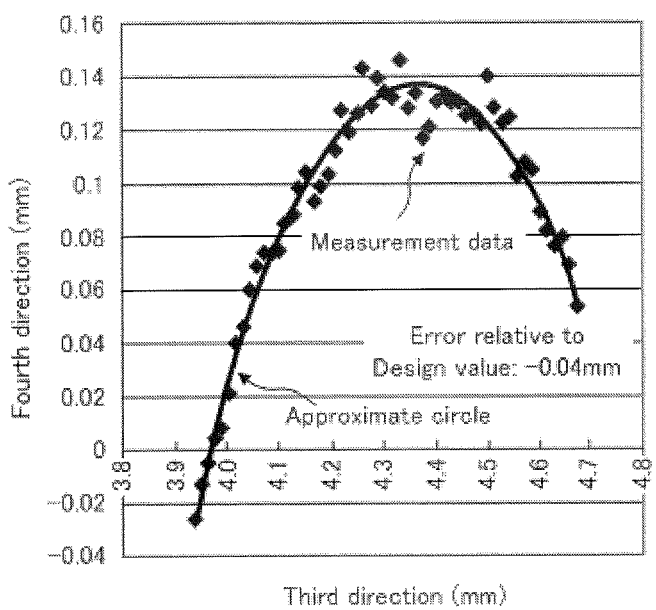

FIGS. 5A and 5B are diagrams illustrating an example of results of measurement of a shape of a front edge R part of a threaded pipe. FIG. 5A is a diagram illustrating an example of a light section line obtained by subjecting an image of laser light L applied to a seal part P4, which has been captured by the image capture device 2, to geometric correction and binarization by the image processing device 3. More specifically, the light section line indicated in FIG. 5A is one obtained by subjecting an image captured by the image capture device 2 to geometric correction to obtain a captured image viewed in a direction perpendicular to the plane NP based on a positional relationship between the optical axis LA of the light source 1 and the visual axis VA of the image capture device 2 and binarizing the captured image. FIG. 5B is a diagram illustrating an enlarged indication of data on the vicinity of the front edge R part P43 indicated in FIG. 5A (data on picture elements included in the light section line) and an approximate circle obtained from the data. Here, the third direction indicated in FIGS. 5A and 5B indicates a direction parallel to the plane NP, and the fourth direction indicates a direction that is parallel to the plane NP and perpendicular to the third direction.

As illustrated in FIGS. 5A and 5B, data on the vicinity of a front edge R part P43 was extracted from data containing a light section line passing through a shoulder face P41, the front edge R part P43 and a seal face P42, and an approximate circle was calculated by, e.g., the least squares method to evaluate a radius of the approximate circle as a curvature radius of the front edge R part P43. As illustrated in FIG. 5B, each of errors relative to a design value was small. In other words, it was found that the end portion shape measurement method according to the present embodiment enables accurate measurement of the curvature (curvature radius) of the front edge R part P43.

REFERENCE SIGNS LIST 1 light source
2 image capture device
3 image processing device
A thread axis
LA optical axis of light source
NP plane including thread axis
P threaded pipe (oil well pipe)
P3 thread part
P4 seal part
VA visual axis of image capture device

The invention claimed is:

1. A method for measuring an end portion shape of a threaded pipe or tube, the method comprising:
  a thread axis detection step of detecting a thread axis of the threaded pipe or tube;
  a laser light positioning step of moving and positioning a light source that emits slit-like laser light and an image capture sensor having a visual axis extending in a direction different from that of an optical axis of the light source together to a position where the laser light emitted from the light source can be applied to a thread part or a seal part of the threaded pipe or tube, the thread part or the seal part being a measurement target region;
  a laser light image capture step of applying laser light from the light source to the measurement target region and capturing an image of the applied laser light by the image capture sensor; and
  a shape calculation step of subjecting the captured image obtained in the laser light image capture step to image processing to calculate a shape of the measurement target region,
  wherein in the laser light positioning step, the light source and the image capture sensor are moved together so that: the optical axis of the light source is located so as to pass through a measurement point on the thread axis, the measurement point being located in the measurement target region within a plane including the thread axis; and the laser light extends in a slit-like form within the plane, and
  wherein in the shape calculation step, at least one of the following (a)-(c) steps is performed:
  (a) subjecting the captured image to image processing to obtain a light section line passing through a flank face of the thread part, calculating an angle of an approximate straight line obtained from data on picture elements included in the light section line, and determining the calculated angle to be an angle of the flank face of the thread part;
  (b) subjecting the captured image to image processing to obtain a light section line passing through a thread root R part of the thread part, calculating a radius of an approximate circle obtained from data on picture elements included in the light section line, and determining the calculated radius to be a curvature radius of the thread root R part of the thread part; and
  (c) subjecting the captured image to image processing to obtain a light section line passing through a front edge R part of the seal part, calculating a radius of an approximate circle obtained from data on picture elements included in the light section line, and determining the calculated radius to be a curvature radius of the front edge R part of the seal part.

* * * * *